United States Patent
Bush et al.

(10) Patent No.: US 7,480,933 B2
(45) Date of Patent: Jan. 20, 2009

(54) METHOD AND APPARATUS FOR ENSURING ADDRESS INFORMATION OF A WIRELESS TERMINAL DEVICE IN COMMUNICATIONS NETWORK

(75) Inventors: Anton Bush, Nottingham (GB); Henry Haverinen, Tampere (FI); Jyri Rinnemaa, Tampere (FI); Mike Smith, Cambridge (GB); Timo Takamäki, Tampere (FI); Jukka Tuomi, Tampere (FI); Hannu Tuominen, Kauniainen (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 10/427,307

(22) Filed: May 1, 2003
(Under 37 CFR 1.47)

(65) Prior Publication Data

US 2004/0148374 A1 Jul. 29, 2004

(30) Foreign Application Priority Data

May 7, 2002 (GB) ................................. 0210267.1

(51) Int. Cl.
G06F 21/20 (2006.01)
G06F 15/16 (2006.01)

(52) U.S. Cl. ........................................ 726/4; 709/227
(58) Field of Classification Search ........................ None
See application file for complete search history.

(56) References Cited

U.S. PATENT DOCUMENTS

| | | | |
|---|---|---|---|
| 5,708,654 A | 1/1998 | Arndt et al. | 370/242 |
| 6,073,178 A * | 6/2000 | Wong et al. | 709/229 |
| 6,269,395 B1 * | 7/2001 | Blatherwick et al. | 709/219 |
| 6,272,129 B1 * | 8/2001 | Dynarski et al. | 370/356 |
| 6,466,571 B1 * | 10/2002 | Dynarski et al. | 370/352 |
| 6,745,333 B1 * | 6/2004 | Thomsen | 726/23 |
| 6,806,813 B1 * | 10/2004 | Cheng et al. | 340/825.49 |
| 6,823,454 B1 * | 11/2004 | Hind et al. | 713/168 |

(Continued)

FOREIGN PATENT DOCUMENTS

GB   2363043 A1   12/2001

(Continued)

OTHER PUBLICATIONS

Tanenbaum, "Computer Networks, Third Edition", 1996, Prentice Hall PTR, p. 412-419.*

(Continued)

*Primary Examiner*—Christopher A Revak
(74) *Attorney, Agent, or Firm*—Harrington & Smith, PC (57) ABSTRACT

A method and device for ensuring address information of a wireless terminal device in a wireless local area network, the network comprising; an access point for setting up a communication connection to the terminal device, the method comprising establishing a communication connection between the terminal device and the access point (101), and relaying data packets from the terminal device to the network and from the network to the terminal device (105). The method further comprising the steps at the access point: detecting an IP address of the terminal device in response to the established communication connection (103), associating the detected IP address of the terminal device to the MAC address of the terminal device (104), and comparing that the address information of the terminal device on the relayed data packets are corresponding to the associated address information (111, 112).

25 Claims, 3 Drawing Sheets

U.S. PATENT DOCUMENTS

| | | | |
|---|---|---|---|
| 7,032,242 B1 * | 4/2006 | Grabelsky et al. | 726/11 |
| 7,072,340 B2 * | 7/2006 | Agrawal et al. | 370/392 |
| 7,096,257 B2 * | 8/2006 | Trisno et al. | 709/220 |
| 7,174,376 B1 * | 2/2007 | Daruwalla | 709/223 |
| 2001/0017856 A1 * | 8/2001 | Asokan et al. | 370/389 |
| 2001/0038626 A1 * | 11/2001 | Dynarski et al. | 370/356 |
| 2002/0075836 A1 * | 6/2002 | Uematsu | 370/338 |
| 2002/0138614 A1 * | 9/2002 | Hall | 709/225 |
| 2002/0165972 A1 * | 11/2002 | Chien et al. | 709/229 |
| 2003/0142642 A1 * | 7/2003 | Agrawal et al. | 370/328 |
| 2006/0161770 A1 * | 7/2006 | Goto et al. | 713/167 |

FOREIGN PATENT DOCUMENTS

| | | |
|---|---|---|
| JP | 2001103086 | 4/2001 |
| WO | WO-0044149 | 7/2000 |
| WO | WO-0113656 A1 | 2/2001 |
| WO | WO-0141472 A1 | 6/2001 |
| WO | WO-02073934 A2 | 9/2002 |
| WO | WO-02096069 A2 | 11/2002 |

OTHER PUBLICATIONS

Ishibashi et al., "A protection method against unauthorized access and/or address spoofing for open network access systems", IEEE Pacific Rim Conference on Communications, Computer and Signal Processing 2001, pp. 10-13, vol. 1.

Kanlayasari et al., "Detecting Denial of Service Using BENEF Model: An Alternative Approach", Applied Network Research Group, Kasetsart University, Bangkok, Thailand, Jan. 2001, 8 pages.

* cited by examiner

METHOD AND APPARATUS FOR ENSURING ADDRESS INFORMATION OF A WIRELESS TERMINAL DEVICE IN COMMUNICATIONS NETWORK

The present application claims priority to United Kingdom Patent Application No. 0210267.1, filed on May 7, 2002, and entitled "Method and Apparatus for Ensuring Address Information of a Wireless Terminal Device in a Communications Network".

The present invention relates to a method and apparatus for ensuring address information of a wireless terminal device in a communications network and particularly, although not necessarily, for ensuring the integrity of the amount of transferred data of a wireless terminal device having controlled access to a wireless local area network.

PRIOR ART

A wireless local area network typically comprises a network comprising terminal devices, such as wireless terminal devices or portable computers and access points, wherein data transmission between the terminal devices and the access points is carried out partly or entirely in a wireless manner using radio waves or infrared technology.

The structure of telecommunications networks is generally described using the OSI model (Open System Interconnection), which defines the interfaces through which the different devices and the related software communicate with each other. The OSI model is based on a concept of layers, the lowest, or first, layer being known as a Physical Layer encompassing all logical, electrical and mechanical issues relating to data transfer. The second protocol layer, i.e. the Data Link Layer, is responsible for connection set-up, error correction and connection release. The third protocol layer, i.e. the Network Layer, provides data transfer not dependent on the network structure. The subsequent layers are the Transport Layer (fourth layer), Session Layer (fifth layer), Presentation Layer (sixth layer), and Application Layer (seventh layer).

In the OWLAN (Operator Wireless Local Area Network) system, authentication and access control currently take place on the third layer of the OSI model, i.e. the network layer, or IP layer (Internet Protocol Layer), and WLAN-association between the terminal device and the Access Point is carried out without authentication. An access point is a physical device, such as a base station, interconnecting a wireless network and a wired one. In Open System Authentication the association event does not involve actual authentication, but the open system authentication, performed before association, is null authentication. After the association, the terminal device is typically provided with an IP address by means of an IP-based DHCP (Dynamic Host Configuration Protocol) method. Authentication is then carried out by executing an IP-based authentication protocol. Although the authentication protocol also employs protocol layers above the IP layer, the authentication is in this case referred to as authentication of the third protocol layer because access control is typically implemented on the third protocol layer. The Operator Wireless LAN solution includes the Network Access Authentication Protocol (NAAP), which is a protocol of the third protocol layer to authenticate the wireless terminal using the GSM Subscriber Identity Module. Another example of a third protocol layer authentication protocol are solutions based on the Hypertext Transfer Protocol (HTTP), where the authentication is performed using a World Wide Web (WWW) page in which the user fills in the credentials. Yet another example of a third protocol layer authentication protocol is the Internet Key Exchange (IKE) Protocol, which is used when setting up a Virtual Private Network connection. In all these examples, the wireless terminal needs to perform the third protocol layer authentication protocol before it can access the resources for which access control is being enforced.

Standardization provides a framework for hardware and software manufacturers to enable products of different manufacturers to be used side by side. The title of the WLAN standard is IEEE 802.11 and it has gradually been supplemented by a number of sub-standards. According to the forthcoming IEEE 802.11i standard, WLAN authentication will be carried out according to a second protocol layer authentication method, such as an IEEE802.1x protocol before transmission of IP packets between the terminal device and the network.

A router device in the OWLAN system called an access controller functions as the other party in the authentication carried out according to the third protocol layer, i.e. open system authentication and it maintains an Access Control List (ACL) of authenticated terminal devices. The access controller may be placed as the first router, i.e. the edge router, which is between the communications network and the wireless terminals connected to the wireless local area network, or the access controller may also be placed deeper in the network. The IEEE is standardizing a new WLAN authentication system where authentication is performed against the Access Point. The upcoming versions of the Nokia Operator Wireless LAN solution will allow a wireless terminal to access a network by using either a third protocol layer authentication, such as open system authentication or second protocol layer authentication, such as according to the IEEE 802.1x protocol. An Access Point enables both Open System Authentication, in which the terminal device is authenticated at a later stage according to the third protocol layer, and authentication of the second protocol layer, such as IEEE 802.1x authentication. Certain network elements of the Wireless LAN solution can support both the new IEEE 802.1x layer 2 authentications standard and the current layer 3 authentication in a backward compatible way. However, the access point may not always be responsible of the collection of accounting data. Instead, the access router (access controller such as the Nokia P022) may collect the accounting information in some implementations. The accounting information includes the connection time and the amount of data transferred.

When accounting for connection time, the problem is that the access controller has no way of knowing when the terminal leaves the access network. In fact, an individual access point may not necessarily be able to tell whether a terminal left the network or simply is performing a handover to another access point. When accounting for amount of transferred data, the access point can ensure that packets sent by authenticated terminals (MAC addresses) are only forwarded to the network. The MAC addresses are not necessarily visible to the access controller, especially if the access controller is not the first router but resides deeper in the network, so the access controller counts the packets from a certain IP address. Hence, it could be possible for a terminal to send packets from somebody else's IP address but his own MAC address, and thereby get the packets through without paying for the connection.

SUMMARY OF THE INVENTION

A method and apparatus has now been invented for checking address information of a wireless terminal device in a wireless local area network.

An Access Point (in following also short AP) of the invention checks that a wireless terminal has the right IP address in the data packets the terminal sends to and receives from a communication network. With this the problem of sending of data packets on the account of another wireless terminal is prevented or at least mitigated. The AP learns the IP address of the terminal and maps it to the terminal's identifying information received from the terminal device. The access point detects the IP addresses in the data packets that the terminal device sends and receives and compares the detected IP address to the IP address that is mapped to the identifying information of the terminal device. If the detected IP address and the mapped IP address do not match, the access point discards the data packets of the terminal device.

According to a first aspect of the invention a method is provided for checking address information of a wireless terminal device in a wireless local area network, the network comprising an access point for setting up a communication connection to the terminal device, the method comprising: establishing a communication connection between the terminal device and the access point, receiving identifying information from the terminal device, characterised by the method further comprising at the access point: detecting an IP address of the terminal device after having established the communication connection, associating the detected IP address of the terminal device to the identifying information received from the terminal device, relaying data packets from the terminal device to the network and from the network to the terminal device, said data packets comprising an IP address, and comparing if the IP address in the relayed data packets corresponds to the associated IP address.

According to a second aspect of the invention an access point is provided for setting up a communication connection to a terminal device in a wireless local area network, the access point comprising; establishing means for establishing a communication connection between the terminal device and the access point, receiving means for receiving identifying information from the terminal device, characterised by the access point further comprising: detecting means for detecting an IP address of the terminal device after having the established communication connection, associating means for associating the detected IP address of the terminal device to the identifying information received from the terminal device, and relaying means for relaying data packets from the terminal device to the network and from the network to the terminal device, said data packets comprising an IP address, and comparing means for comparing if the IP address in the relayed data packets corresponds to the associated IP address.

According to a third aspect of the invention an access point is provided for setting up a communication connection to a terminal device in a wireless local area network, the access point comprising; an establisher configured to establish a communication connection between the terminal device and the access point a receiver configured to receive identifying information from the terminal device, the information identifying said terminal device, and characterised by the access point further comprising: a detector configured to detect an IP address of the terminal device after having the established communication connection, a memory configured to store an association of the detected IP address of the terminal device to the identifying information received from the terminal device, and a relay configured to relay data packets from the terminal device to the network and from the network to the terminal device, said data packets comprising an IP address of the terminal device, and
a comparator configured to compare if the IP address in the relayed data packets corresponds to the associated IP address.

According to a fourth aspect of the invention a computer program product is provided for an access point setting up a communication connection to a terminal device in a wireless local area network, the access point comprising; establishing means for establishing a communication connection between the terminal device and the access point, receiving means for receiving identifying information from the terminal device, the information identifying said terminal device, and characterised by the computer program product comprising: computer program means for causing the access point to detect an IP address of the terminal device after having the established communication connection, computer program means for causing the access point to associate the detected IP address of the terminal device to the identifying information of the terminal device, and computer program means for causing the access point to relay data packets from the terminal device to the network and from the network to the terminal device, said data packets comprising an IP address, and computer program means for causing the access point to compare if the IP address of the terminal device in the relayed data packets corresponds to the associated IP address.

The advantages of the invention include authenticity and integrity of accounting. If accounting information is collected based on IP address of a terminal device in another network element than an access point, e.g. in an access controller, the method of the invention provides a solution for checking that the IP address belongs to the right terminal device and accounting is performed to the right terminal device.

In case of computer break-in, by comparing IP level logs and WLAN level logs to each other the terminal device that has sent the packets will be detected and identified. Because the MAC address of the terminal device is always authentic traceability will become better. If a firewall that filters data packets on the basis of an IP address is in use in a network, by the way of the method of the invention it is ensured that the terminal device cannot access to the network behind the firewall by using a wrong IP address.

Further an advantage is that an erroneously configured or erroneously operating terminal device is not able to cause any damage in the network. Also a network operator may be sure that double accounting or erroneous accounting cannot happen when using the method of the invention.

In the following, the invention will be described in greater detail with reference to the accompanying drawings, in which.

Figure 1:
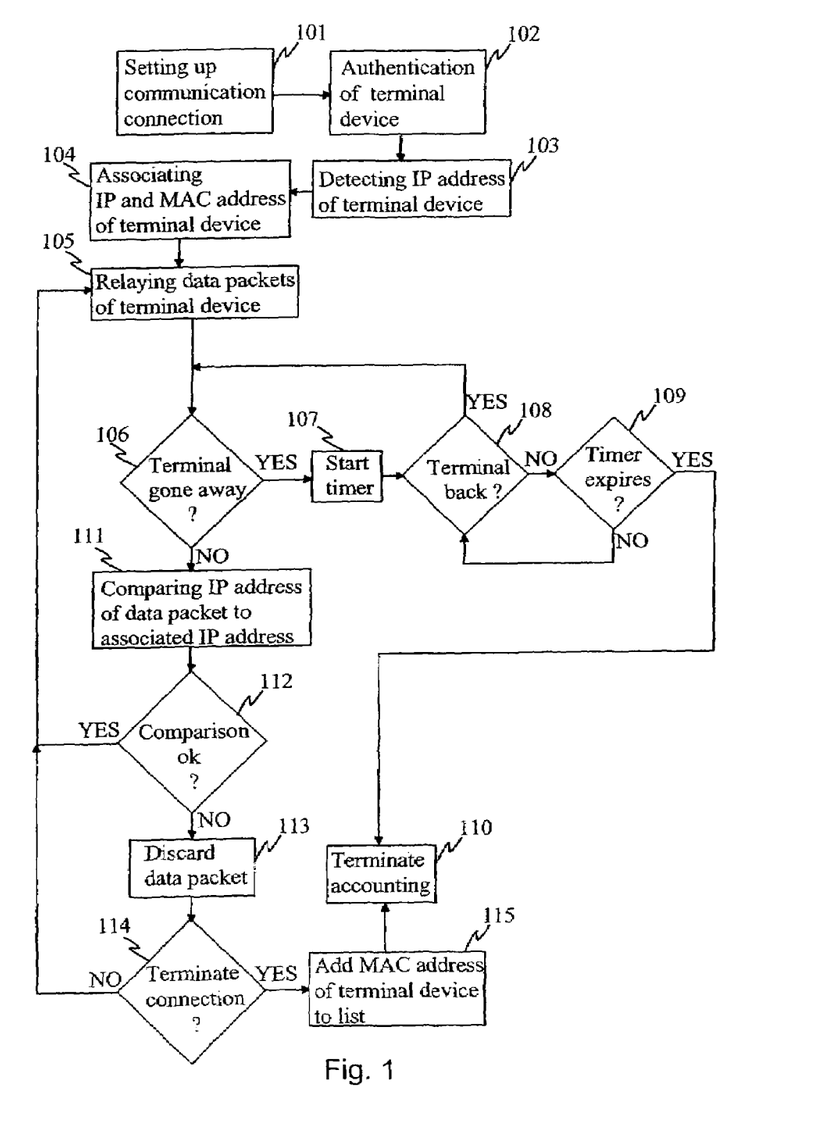
FIG. 1 is a flow diagram illustrating a method according to an embodiment of the invention.

FIG. 1 shows a flow diagram of a method according to an embodiment of the invention. The steps of the method may be preferably implemented as a computer program code stored into the memory of the access point. In step 101 an access point, and a terminal device, such as a wireless communications device, set up a communication connection and associate with each other. During the association the access point receives the MAC address of the terminal device. Authentication of the terminal device is performed next (step 102). If the terminal device is authenticated according to the IEEE 802.1x protocol, authentication is first carried out between the terminal device and the access point. After a successful authentication according to the IEEE 802.1x protocol, the terminal receives an IP address for example from the DHCP server, which may be located for example at the access point or elsewhere in the network, and the access point transmits information about the event to the access controller. If the terminal employs the Open system Authentication method, the terminal receives an IP address from a DHCP server, for example, which may be located at the access point, authentication agent, or elsewhere in the network after which an IP-based authentication protocol according to the third protocol layer is executed. An IP layer authentication is carried out between a terminal device and an authentication agent. Preferably the access point detects the IP address of the terminal device when the terminal device receives the IP address from for example the DHCP server when using the DHCP protocol transactions (step 103). Hence, steps 102 and 103 may be performed in a different order if the terminal employs the open system authentication method. The access point needs to keep track of IP address/MAC address mappings of all visiting wireless terminals. Even if a terminal joins the network without authentication (open system authentication), the access point needs to find out the terminal's IP address. The access point can learn the terminal's IP address for example by listening to the DHCP packets that the terminal sends and receives. Alternatively, the access point may include a DHCP relay function. Preferably the access point stores the IP address in the memory located at the access point. The IP address and MAC address of the terminal device are associated with each other (step 104) and relaying of data packets of the terminal device is enabled (step 105).

In step 106 the access point detects if an associated terminal goes away from a service area, e.g. termination of a connection or a shadow region (region within the coverage area in which effective radio reception of signals is improbable), to stop accounting for that terminal. Even if the terminal goes away from a service area of a certain access point, it may not have left the entire access network. It may re-associate with the same access point, or perform a handover to another access point. When the access point detects that a terminal has gone away, the access point schedules a timer (step 107). If the terminal does not associate with this access point or with another access point (step 108) before the timer expires (step 109), the access point signals the access controller that accounting should be stopped (step 110) and deletes any state it has allocated for the terminal device. If the terminal device appears before the timer expires (step 108), the access controller is not signalled. The access point will find out if the terminal device associates with another access point using the Inter Access Point Protocol. Alternatively, when the access point detects that a terminal device has gone away (step 106), it immediately signals the access controller. The access controller schedules a timer (step 107). If the terminal does not associate with an access point (step 108) before the timer expires (step 109), the access controller detects that the terminal has left and stops accounting (step 110). Whenever a terminal device associates with an access point (step 108), the access point signals the access controller so that the access controller can cancel any timers that it might have scheduled and continue to step 111.

For the terminals that use IEEE 802.11i, the packets include a message integrity code, which ensures that only authorized terminals are able to send packets. However, the usual checks on the access point only verify that the MAC address belongs to an authorized terminal. Because the access controller looks at IP addresses, the usual 802.11i checks are not sufficient to ensure accounting integrity. Therefore, on receipt of a packet from a wireless terminal or destined to a wireless terminal, the access point needs to verify that the IP address matches the MAC address (step 111). Upon receipt of a data frame from a terminal device, the access point verifies that the IP source address equals the IP address stored at step 103. Similarly, upon receipt of a data frame from the distribution system (wired network), the access point verifies that the destination MAC address and the destination IP address belong to the same terminal device. Alternatively, if terminal classes are used, upon receipt of a data frame from a terminal device, the access point verifies that the source IP address belongs to the IP address pool of the correct terminal class. In other words, if the terminal device is Open System terminal, the IP source address must belong to the IP address pool of Open System terminals, and if the terminal device is an IEEE 802.1x terminal, then the IP source address must belong to the IP address pool of IEEE 802.1x terminals. Similarly, upon receipt of a data frame from the distribution system (wired network), the access point first detects the terminal class based on the destination MAC address and then verifies that the destination IP address is from the address pool of the correct terminal class. If the IP address is not what it should be, the access point silently discards the packet (step 113). If comparison is ok at step 112 the access point continues relaying data packets of the terminal device (step 105). These operations will ensure, that the amount of transferred data calculated by the access controller is correct. An attacker will not be able to send packets with someone else's IP address. After discarding a data packet of a terminal device, the access point may have ability to terminate connection to the terminal device (step 114). If the access point does not have the ability or at step 114 it does not terminate the connection to the terminal device, the procedure continues to step 105. If the access point decides to terminate the connection at step 114, it may further have ability to add the MAC address of the terminal device to the list of misbehaving terminal devices (step 115), said list is stored e.g. in a memory of the access point. Finally, the access point terminates accounting of the terminal device or signals it to e.g. an access controller (step 110).

Figure 2:
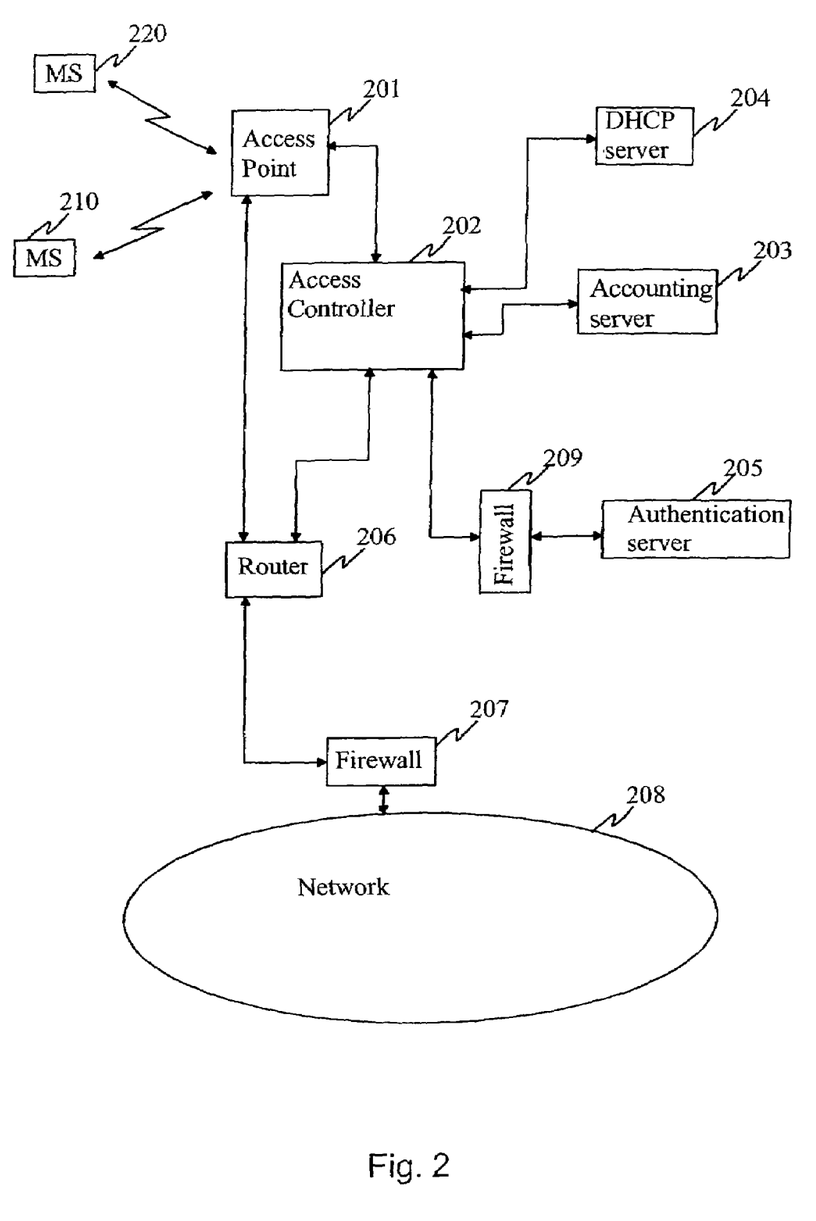
FIG. 2 illustrates a system where the invention can be used.

FIG. 2 shows a system according to the invention. The system can be a plain 802.11i or 802.1x system or it can support both open systems access terminals and above-mentioned 802.11i and/or 802.1x terminals. The method and device of the invention is not restricted to the system described in here. As an example, a system is described that comprises an access point 201 for establishing a wireless communication connection to a terminal device and relaying data packets between a terminal device and a communication network, an access controller 202 for controlling access of a terminal device, such as an open system terminal, router 206 for routing data packets of a terminal device, first terminal device 210 operating as a 802.1x terminal in a 802.1x system and second terminal device 220 operating as an open system terminal in an open system. The system may further comprise an accounting server 203 for accounting connection time and/or transferred amount of data of the terminal devices (210, 220), DHCP server 204, for providing IP address to a terminal device, authentication server for authenticating a terminal device to the network, firewall 207 for providing access to the secure network 208.

An access point supporting e.g. both 802.1x and Open Systems authentication becomes vulnerable to certain malicious attacks, since the Access Point controls the other access method and an Access Controller the other. If the Access Point would just let Open Systems users to the network without any further checking, it would be quite straightforward to steal some other user's identity in the access zone. This can be done e.g. by changing IP or MAC-addresses of a terminal device during the session in order to get some other users identity even temporarily. This kind of identity stealing could cause the network to send another user's traffic to a hostile attacker. Also by getting another users identity the attacker could use the network on the other user's cost.

In the next example it is assumed that accounting is performed based on an IP address of the terminal devices 210, 220. Accounting is performed centrally for both terminals at accounting server 203. The terminal 220, which is an open access terminal, authenticates to the wireless local area network and gets an IP address e.g. from DHCP server 204 or from authentication server 205. The terminal 220 gets access to the network 208 through the firewall 207 and starts to send and receive data packets. Also the terminal 210, which is an 802.1x terminal, authenticates to the wireless local area network. The terminal 210 finds out and starts to use the IP address assigned for the terminal 220. The terminal 210 sends data packets to a wired network, e.g. to the network 208. Now the accounting server 203 does not charge the terminal 210, only the terminal 220 is charged, because the same IP address is in use at both terminals 210 and 220.

Accounting e.g. the billing information of the terminals 210 and 220 may alternatively be in different elements, e.g. so that the access controller 202 or the accounting server 203 is accounting transferred data of the terminal 220 and the access point 201 is accounting transferred data of the terminal 210. In the present open access systems accounting is performed on the basis of IP address and in 802.1x and 802.11i systems accounting is performed on the basis of MAC address. In such a situation, the terminal 210 cannot send data packets for free even if it is using the IP address of the terminal device 220. The access point 201 is accounting the data packets that the terminal 210 sends/receives and the access controller 202 or accounting server 203 is charging the terminal device 220 also for the data packets the terminal device 210 sends when using the IP address of the terminal device 220.

Even if the terminal device 210 cannot send data packets for free, it can send data packets by using the IP address of the terminal device 220 to make it look like the terminal device 220 would have sent the packets. The terminal device 210 can also receive data packets on the basis of IP address of the terminal device 220. If the terminal device 210 sends an ARP-packet to other network elements, it is possible to direct the data packets belonging to the terminal 220 to the terminal device 210. ARP packets are special data packets used for MAC address/IP address mapping management. An ARP packet can be used to update information to the network elements that a particular IP address belongs to a particular MAC address. By using the IP address of the terminal device 220, it is possible for the terminal device 210 to gain access to the network 208 to where it would normally be allowed to access.

Another security problem may arise, when the terminal device 210 uses the IP address of a network element such as the access point 201 or the access controller 202 to gain access to the authentication server 205 through the firewall 209. In the following example the firewall allows the access to the authentication server only for the IP addresses belonging to the access point 201 and/or access controller 202. If the terminal device 210 somehow finds out the IP address of the access point or the access controller, it can gain access to the authentication server through the firewall 209 and e.g. steal information or upload a virus to the server.

When the access point 201 is using the method of the invention, misuse of IP address, as described above, is made more difficult. The access point 201 detects an IP address of the terminal devices 210 and 220, associates it to the MAC address and stores said IP and MAC address of the terminal device to a map. The access point then compares that the IP address information with the relayed data packets are corresponding to the associated IP and MAC address information on the map. Let us consider the following situation, wherein the terminal device 220 uses IP address, say IP1. The access point has associated the IP1 to the MAC address of the terminal device 220, MAC1. When the terminal device 210 connects to the network it gets another IP address, after the authentication procedure, IP2. The access point now associates the IP2 to the MAC address of the terminal device 210, MAC2. If the terminal device 210 changes the IP address IP2 to IP1, and sends data packets to the network through the access point 201, the access point notices that the IP address and MAC address combination in the data packets is not the same as being associated to the map of the access point. The map may simply comprise a list of IP addresses and another list of MAC addresses, each IP address linked to a corresponding MAC address. Now the access point discards those data packets the terminal device has sent to the network. It may further terminate the connection to the terminal device and add the MAC address of the terminal device to a list. The list may comprise e.g. all those terminals, which attempted to send or receive data packets by using the IP address of another terminal. Similarly the access point discards those data packets coming from the network to a terminal device wherein the IP and the MAC address does not match to the information on the map of the access point 201.

Figure 3:
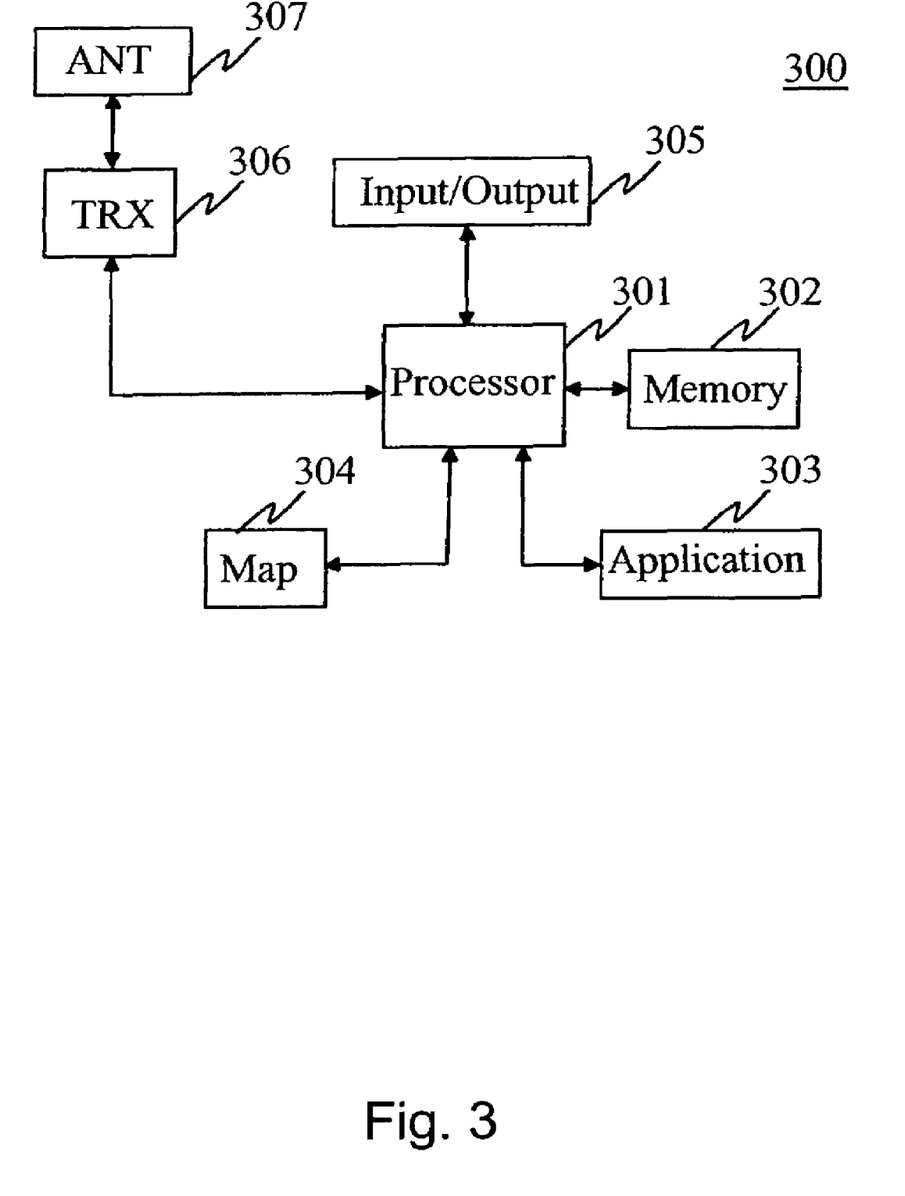
FIG. 3 illustrates an access point according to an embodiment of the invention.

FIG. 3 shows an access point 300 of an embodiment of the invention. The access point operates in a system that may be e.g. plain 802.1x or 802.11i system or the system can support two or more different systems, such as 802.1x terminals and open system terminals. The access point 300 comprises a processor 301 and memory 302 for executing the applications stored at the access point, at least one application 303 for carrying out e.g. the method of the invention as illustrated in the description of FIG. 1. The access point 300 further comprises an interface 305 for connecting to the router, to servers, such as an access controller, or authentication server, for example. The access point further comprises transceiver 306 and antenna 307 for setting up a wireless communication connection to wireless terminal. The access point may further comprise a map 304 for mapping the IP address and the MAC address of the terminal device. Alternatively the map 304 may be stored in the memory 302 of the access point 300.

The access point establishes a communication connection to the terminal device by means of transceiver 306, antenna 307, processor 301 and suitable application stored in the access point 303. Preferably the access point identifies the authentication method by receiving a message from the terminal device, said message indicating the authentication method the terminal is using. If the terminal employs the open system authentication method, the message is preferably an authentication request message according to the IEEE 802.11 standard, said authentication request message indicates open system authentication. If the terminal employs the IEEE 802.1x authentication method, the message is an association request message preferably according to the IEEE 802.11i standard. Said association request message comprises an authentication suite element indicating IEEE 802.1x authentication.

A terminal employing the open system authentication method receives an IP address for use from the DHCP server, which may be located at the authentication agent or, alternatively, at the access point or elsewhere in the network. The access point 300 relays authentication messages between the terminal and the authentication agent, which operates as the authenticator entity and authenticates the terminal device by using the IP-based authentication method of the third protocol layer. The authentication agent typically uses the authentication service provided by the authentication server by further relaying the authentication information between the terminal device and the authentication server, which verifies the authentication information. After the authentication, the authentication agent sends information about a successful authentication and the identifier data of the terminal, such as the terminal IP address or MAC address, to the access controller, which adds it to the access control list and starts to relay the data packets of the terminal.

When a terminal uses the IEEE 802.1x protocol for authentication, the access point operates as the authenticator entity and authenticates the terminal by using the IEEE 802.1x protocol of the second protocol layer. The access point typically uses the authentication service provided by the authentication server by relaying the authentication information between the terminal device and the authentication server, which verifies the authentication information. The access point may send information about a successful authentication and the identifier data of the terminal, such as the terminal IP address or MAC address, to the access controller, which adds the identifier data of the terminal to the access control list and starts to relay the data packets of the terminal.

When the IP address and the MAC address of the terminal device are detected, the access point then associates said IP address to said MAC address e.g. by adding the IP address and the MAC address to the map 304.

When relaying the data packets of an authenticated terminal device, the access point compares the source IP address of the data packets, coming from the terminal device, to the IP address in the map 304. Further the access point may preferably compare the destination IP address of the data packets, coming from the network to the terminal device, to the IP address in the map 304.

When relaying ARP packets sent by an authenticated terminal device, the access point similarly compares the IP address field in the ARP packet to the IP address in the map 304.

When the access point detects that the IP address in the data packets (source IP or destination IP) does not correspond to the IP address in map 304, the access point may silently discard all those data packets of the terminal device. Further the access point may add the IP and/or MAC address of the terminal device to a list that comprises terminal devices that misuses the IP addresses. Finally the access point may disconnect the terminal device from the network.

The communication connection between the terminal device and the access point performs integrity protection that is security measures used to protect data from unauthorised modifications while it is stored or passed over the network. Integrity protection is performed between the terminal device and the access point. There are several well-known technologies for integrity protection, such as keyed message authentication codes (MAC) which require a symmetric key to be shared by the terminal device and the access point. A MAC can be calculated over the data and transmitted along the data. The receiver of the data calculates a copy of the MAC and verifies that the received MAC equals the calculated MAC. If the MAC values match, the received data is the same as the data that was sent.

The invention is not restricted to open system or a system according to IEEE802.11i protocol or the IEEE 802.1x protocol. The method of the invention may be used also e.g. 802.11, Bluetooth or similar wireless local area networks. The invention can be used in any such system wherein a terminal can access to network by establishing a connection through an access point.

The above disclosure illustrates the implementation of the invention and its embodiments by means of examples. A person skilled in the art will find it apparent that the invention is not restricted to the details of the above-described embodiments and that there are also other ways of implementing the invention without deviating from the characteristics of the invention. The above embodiments should thus be considered as illustrative and not restrictive. Hence the possibilities of implementing and using the invention are only restricted by the accompanying claims and therefore the different alternative implementations of the invention, including equivalent implementations, defined in the claims also belong to the scope of the invention.

The invention claimed is:

1. A method, comprising:
receiving unique device identifying information from a wireless terminal device in a wireless local area network,
detecting a unique routing address of the wireless terminal device,
associating the detected unique routing address of the wireless terminal device with the unique device identifying information received from the wireless terminal device,
receiving data packets from or to the wireless terminal device, said data packets comprising a particular routing address, and
checking a secure use of routine address information by comparing whether the particular routing address in the received data packets corresponds with the unique routing address and associated unique device identifying information for the wireless terminal device from or to which the packets have been or are to be relayed, and
relaying the data packets between the wireless terminal device and the network based on said comparison.

2. A method according to claim 1, wherein the particular routing address is a destination Internet protocol address of the data packets going to the wireless terminal device, and wherein the destination Internet protocol address is compared to the unique routing address and associated unique device identifying information.

3. A method according to claim 1, wherein the particular routing address is a source Internet protocol address of the data packets coming from the wireless terminal device, and wherein the source Internet protocol address is compared to the unique routing address and associated unique device identifying information.

4. A method according to claim 1, wherein the access point is arranged to detect the unique routing address of the wireless terminal device from dynamic host configuration protocol packets that the wireless terminal device sends and/or receives.

5. A method according to claim 1, wherein the access point is arranged to detect the unique routing address of the wireless terminal device when the access point is relaying the dynamic host configuration protocol packets of the wireless terminal device.

6. A method according to claim 1, wherein the access point is arranged to discard a data packet if the particular routing address of the data packet sent to or received from the wireless terminal device does not correspond to the unique routing address and associated unique device identifying information.

7. A method according to claim 1, wherein the access point is arranged to terminate the connection between the access point and the wireless terminal device if the particular routing address of the data packet sent to or received from the wireless terminal device does not correspond to the unique routing address and associated unique device identifying information.

8. A method according to claim 6, wherein based on said comparison the unique device identifying information of the wireless terminal device is added to a list of terminals behaving badly.

9. A method according to claim 8, wherein the communication connection between the wireless terminal device and the access point has an integrity protection comprising the MAC address of the wireless terminal device.

10. A method according to claim 1, wherein the unique device identifying information is a MAC address.

11. A method according to claim 1, wherein the unique routing address is an Internet protocol address.

12. A method according to claim 1, wherein the method comprises establishing a communication connection between the wireless terminal device and an access point, and detecting the particular routing address of the wireless terminal device after having established the communication connection.

13. An access point for secure communication connection to a terminal device in a wireless local area network, the access point comprising;
- receiving means for receiving unique device identifying information from the terminal device,
- detecting means for detecting a unique routing address of the terminal device,
- associating means for associating the detected unique routing address of the terminal device to the unique identifying information received from the terminal device using the receiving means for receiving unique device identifying information,
- receiving means for receiving data packets to or from the terminal device, said data packets comprising a particular routing address, and
- comparing means for checking a secure use of routing address information by comparing whether the particular routing address in the received data packets, received via the receiving means for data packets, corresponds with the unique routing address and associated unique device identifying information for the terminal device to or from which the packets are to be or have been relayed, and
- relaying means for relaying data packets between the terminal device and the network based on said comparison.

14. An access point according to claim 13, wherein the particular routing address is a destination Internet protocol address and the comparing means is arranged to compare the destination Internet protocol address of the data packets going to the terminal device to the unique routing address and associated unique device identifying information of the terminal device.

15. An access point according to claim 14, wherein the particular routing address is a source Internet protocol address and the comparing means is arranged to compare the source Internet protocol address of the data packets coming from the terminal device to the unique routing address and associated unique device identifying information of the terminal device.

16. An access point according to claim 14, wherein the detecting means is arranged to detect the unique routing address of the terminal from dynamic host configuration protocol packets the terminal device sends and receives.

17. An access point according to claim 14, wherein the detecting means is arranged to detect the unique routing address of the terminal device when the access point is relaying the dynamic host configuration protocol packets of the terminal device.

18. An access point according to claim 14, wherein the access point further comprises discarding means for discarding the data packet of the terminal device if the particular routing address of the data packet sent to or received from the terminal device does not correspond to the unique routing address and associated unique device identifying information.

19. An access point according to claim 18, wherein the discarding means is further arranged to terminate the connection between the access point and the terminal device.

20. An access point according to claim 15, wherein the unique device identifying information is a MAC address.

21. An access point according to claim 15, wherein the unique routing address is an Internet protocol address.

22. An access point according to claim 15, comprising an establishing means for establishing a communication connection between the terminal device and the access point, and wherein the detecting means is for detecting the unique routing address of the terminal device after having established the communication connection using the establishing means.

23. An apparatus, comprising;
- a receiver configured to receive unique device identifying information from a terminal device in a wireless local area network, the information identifying said terminal device,
- a detector configured to detect a unique routing address of the terminal device,
- a memory configured to store an association of the detected unique routing address of the terminal device with the unique device identifying information received from the terminal device using the receiver for receiving unique device identifying information,
- a receiver configured to receive data packets to or from the terminal device, said data packets comprising a particular routing address,
- a comparator configured to check a secure use of routine address information by comparing whether the particular routing address in the received data packets corresponds with the unique routing address and associated unique device identifying information for the terminal device to or from which the packets are to be or have been relayed, received from the memory, and
- a relay configured to relay data packets between the terminal device and the network based on said comparison.

24. A memory embodying a computer program product for an access point executable by a processor to perform operations arranged to provide a secure communication connection to a terminal device in a wireless local area network, the operations comprising;
- receiving unique device identifying information from the terminal device, the information identifying said terminal device,
- causing the access point to detect a unique routing address of the terminal device,
- causing the access point to associate the detected unique routing address of the terminal device with the unique device identifying information of the terminal device,
- receiving data packets to or from the terminal device, said data packets comprising a particular routing address,
- causing the access point to check a secure use of routing address information by comparing the particular routing address of the terminal device in the received data packets with the unique routing address and associated unique device identifying information for the terminal device to or from which the packets are to be or have been relayed, and causing the access point to relay data packets between the terminal device and the network based on said comparison.

25. An apparatus according to claim 23, comprising an establisher configured to establish a communication connection between the terminal device and the apparatus, and wherein the detector is configured to detect the unique routing address of the terminal device after having established the communication connection using the establisher.

* * * * *

UNITED STATES PATENT AND TRADEMARK OFFICE
CERTIFICATE OF CORRECTION

PATENT NO. : 7,480,933 B2 Page 1 of 1
APPLICATION NO. : 10/427307
DATED : January 20, 2009
INVENTOR(S) : Bush et al.

It is certified that error appears in the above-identified patent and that said Letters Patent is hereby corrected as shown below:

In The Claims:

In Claim 1: Column 10, line 27, delete "routine" and replace with --routing--.

In Claim 23: Column 12, line 41, delete "routine" and replace with --routing--.

Signed and Sealed this

Fourteenth Day of April, 2009

JOHN DOLL
*Acting Director of the United States Patent and Trademark Office*